United States Patent
Abd Elhamid et al.

(10) Patent No.: US 8,221,938 B2
(45) Date of Patent: Jul. 17, 2012

(54) METHOD OF MAKING A STABLE HYDROPHILIC COATING/SURFACE ON CARBON-BASED MATERIALS FOR FUEL CELL APPLICATIONS

(75) Inventors: Mahmoud H. Abd Elhamid, Grosse Pointe Woods, MI (US); Youssef M. Mikhail, Sterling Heights, MI (US); Gayatri Vyas Dadheech, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 901 days.

(21) Appl. No.: 12/188,447

(22) Filed: Aug. 8, 2008

(65) Prior Publication Data
US 2010/0035091 A1 Feb. 11, 2010

(51) Int. Cl.
*H01M 8/00* (2006.01)
*H01M 4/64* (2006.01)
*B05D 5/12* (2006.01)

(52) U.S. Cl. ........ 429/535; 429/517; 429/518; 429/520; 429/521; 427/115

(58) Field of Classification Search ............... 427/115; 429/408, 517, 518, 520, 521, 535
See application file for complete search history.

(56) References Cited

U.S. PATENT DOCUMENTS

| | | | | |
|---|---|---|---|---|
| 5,124,173 A * | 6/1992 | Uchiyama et al. | | 427/569 |
| 5,496,655 A * | 3/1996 | Lessing | | 429/425 |
| 6,372,376 B1 | 4/2002 | Fronk et al. | | |
| 6,492,295 B2 * | 12/2002 | Hitomi et al. | | 502/159 |
| 6,709,718 B2 * | 3/2004 | O'Brien | | 427/538 |
| 7,344,776 B2 * | 3/2008 | Kollmann et al. | | 428/379 |
| 7,622,211 B2 * | 11/2009 | Vyas et al. | | 429/479 |
| 7,740,971 B2 * | 6/2010 | Kanba et al. | | 429/514 |
| 2006/0105222 A1 * | 5/2006 | Abd Elhamid et al. | | 429/38 |
| 2006/0257712 A1 | 11/2006 | Elhamid et al. | | |
| 2006/0275642 A1 * | 12/2006 | Vyas et al. | | 429/38 |
| 2007/0037036 A1 | 2/2007 | Winter et al. | | |
| 2008/0096016 A1 * | 4/2008 | Tsurumi | | 428/344 |

* cited by examiner

*Primary Examiner* — Patrick Joseph Ryan
*Assistant Examiner* — Julian Anthony
(74) *Attorney, Agent, or Firm* — BrooksGroup

(57) ABSTRACT

One exemplary embodiment includes a fuel cell component having comprising a carbon chain, and a material grafted to the coating/surface, wherein the material includes ionic or polar groups. One embodiment includes composite plates which include carbon that can be activated and treated to make their surface hydrophilic.

16 Claims, 2 Drawing Sheets

METHOD OF MAKING A STABLE HYDROPHILIC COATING/SURFACE ON CARBON-BASED MATERIALS FOR FUEL CELL APPLICATIONS

TECHNICAL FIELD

The field to which the disclosure generally relates to includes methods of making hydrophilic coating/surfaces for fuel cell applications.

BACKGROUND

Heretofore hydrophilic coatings have been created on fuel cell components. A fuel cell component such as a bipolar plate made from a metal such as stainless steel or a carbon composite has heretofore been coated with a low contact resistant material such as carbon. A hydrophilic coating has also been applied to the low contact resistant coating to avoid blockage by water of the reacting gas flow field defined in the bipolar plate.

SUMMARY OF EXEMPLARY EMBODIMENTS OF THE INVENTION

One exemplary embodiment includes a fuel cell component having comprising a conductive carbon coating, and a material grafted to the coating, wherein the material includes ionic or polar groups.

One exemplary embodiments of the invention includes providing a coating including a carbon chain on a fuel cell bipolar plate and subjecting the coating to a process by which active surface groups are created. Examples of these processes are: ozone treatment, atmospheric plasma and chemical oxidation using strong oxidizers in aqueous solutions such as acidified potassium permanganate. Subjecting the conductive carbon coating on the bipolar plate surface to any of these processes will create reactive groups on the surface of the coating which can be used to graft an ionic polymer onto the coating by the reaction of the ionic polymer with the reactive groups thereafter.

Another exemplary embodiment includes providing a fuel cell bipolar plate having a carbon-based coating thereon, and activating the carbon-based coating to provide reactive groups on a surface thereof, and grafting a material to the coating, wherein the material includes polar groups to make the coating hydrophilic.

In one embodiment, the coating is provided only in the channels of a reacting gas flow field defined by a plurality of lands and channels.

Another exemplary embodiment includes providing a carbon-based coating on a fuel cell bipolar plate, the carbon-based coating including epoxy groups, reacting polyethylenimine (PEI), as an example, containing a plurality of amine groups with the epoxy groups on the carbon-based coating to create a carbon-based polymeric coating with a plurality of amine groups which then renders the surface of the carbon coating with permanent polar groups required to maintain hydrophilicity.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

One exemplary embodiment of the invention includes grafting an ionic polymer or a polymer including polar groups to a fuel cell component including carbon, such as, but not limited to a fuel cell bipolar plate having a coating over at least a portion thereof, with the coating including a carbon chain, or a fuel cell diffusion media layer including a carbon-based paper, mat or felt. In another embodiment the fuel cell component may include a carbon composite material, for example, a carbon composite fuel cell bipolar plate.

In one exemplary embodiment, an ionic polymer or a polymer including polar groups are reacted directly with active groups on a surface of a fuel cell component including carbon. In another exemplary embodiment, a fuel cell component including carbon may be treated to provide active groups on a surface thereof and an ionic polymer or a polymer comprising polar groups may be grafted onto the fuel cell component by reaction with the active groups. In one exemplary embodiment, active groups (reactive functional groups) are created on the surface of a fuel cell component including carbon by exposing the fuel cell component to atmospheric plasma, ozone and/or chemical oxidation in aqueous solution using oxidizers such as acidified potassium permanganate. In one embodiment the active groups are oxygenated groups. In one exemplary embodiment, an ionic polymer such as polyethylenimine (PEI) may be reacted with the active groups on the fuel cell component to add ionic properties to the fuel cell component and to provide a hydrophilic surface. In another embodiment polyvinyl alcohol may be grafted onto the surface or coating including carbon. In one embodiment, the coating provides low contact resistance so that a coating such as gold is not necessary over the bipolar plate.

Figure 1:
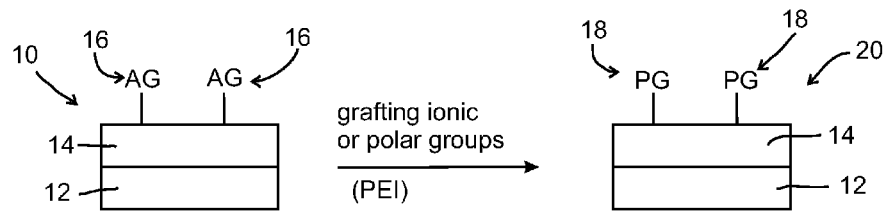
FIG. 1 illustrates a method of grafting ionic or polar groups onto a coating including carbon chains according to one exemplary embodiment.
Figure 2:
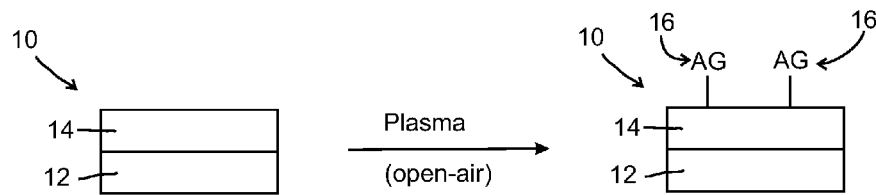
FIG. 2 illustrates a method of activating a coating on a fuel cell bipolar plate using atmospheric plasma according to one exemplary embodiment of the invention.

Referring now to FIG. 1, one exemplary embodiment of the invention includes providing a product such as a substrate 12 having a coating 14 thereon which includes a polymer comprising a carbon chain. The coating includes active groups (AG) 16 on a surface thereof. Ionic or polar groups are provided on the coating by grafting a material including ionic or polar groups that react with the active groups 16 to provide ionic or polar groups (PG) 18 on the coating 14. The coating 14 is electrically conductive. The coating 14 may include a polymer that is electrically conductive in one embodiment, or in another embodiment the coating may include a polymer that is generally insulative and the coating may include electrically conductive filler particles. In various select embodiments, the conductive filler particles may include at least one of gold, platinum, graphite, carbon, conductive metal nitrides and carbides (e.g. titanium nitride, titanium carbide), titanium alloyed with chromium and/or nickel, palladium, niobium, rhodium, rare earth metals, and other noble metals. In one embodiment, the particles will comprise carbon or graphite (i.e. hexagonally crystallized carbon). The particles comprise varying weight percentages of the coating depending on the density and conductivity of the particles (i.e., particles having a high conductivity and low density can be used in lower weight percentages). Carbon/graphite containing coatings will typically contain 25 percent by weight carbon/graphite particles. The polymer matrix may include any water-insoluble polymer that can be formed into a thin adherent film and that can withstand the hostile oxidative and acidic environment of the fuel cell. In various select embodiments, such polymers, as epoxies, silicones (with graphite particles), polyamide-imides, polyether-imides, polyphenols, fluro-elastomers (e.g., polyvinylidene fluoride), polyesters, phenoxy-phenolics, epoxide-phenolics, acrylics, and urethanes, inter alia may be utilized.

Figure 3:
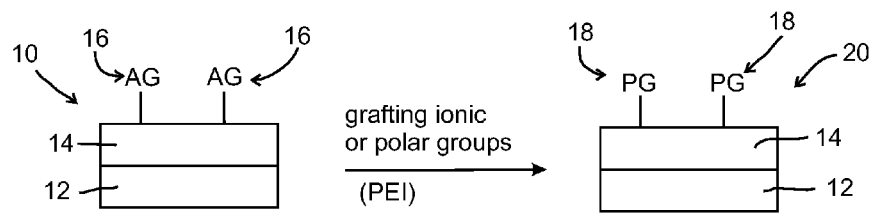
FIG. 3 illustrates a method of grafting an ionic polymer onto a coating including a carbon chain and active groups on the surface of the coating according to one exemplary embodiment of the invention.

In one exemplary embodiment of the invention, the active groups (AG) 16 may be provided by treating a coating 14 including a polymer including a carbon chain by exposure to an atmospheric plasma, ozone or chemical oxidation. After the active groups 16 have been provided on the coating 14, an ionic polymer may be grafted onto the coating 14 to provide ionic or polar groups (PG) 18 as shown in FIG. 3.

Figure 4:
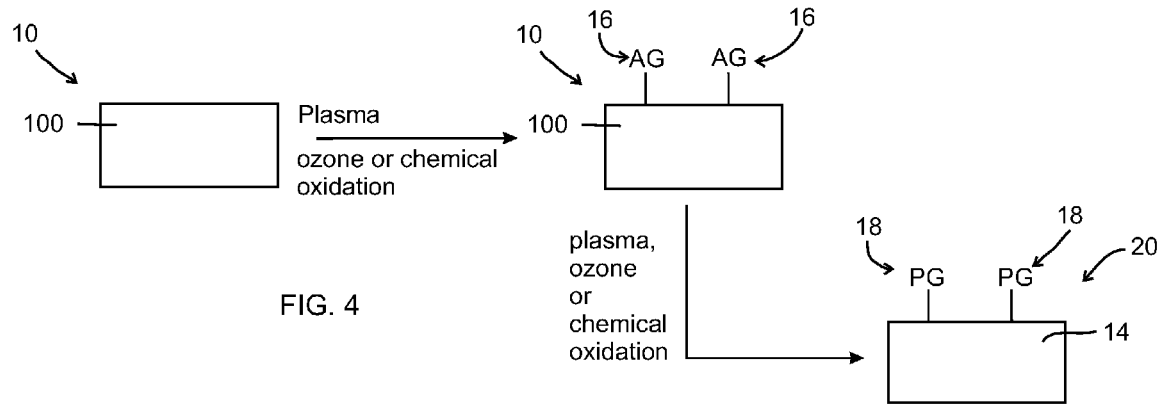
FIG. 4 illustrates a method of grafting an ionic polymer or a polymer with polar groups to a fuel cell diffusion media layer including a carbon-based paper, mat or felt.

Referring now to FIG. 4, another embodiment of the invention includes a method of providing ionic or polar groups on a fuel cell diffusion media layer which may be provided in a fuel cell adjacent the bipolar plate and overlying an electrode membrane assembly in a manner known to those skilled in the art. The diffusion media layer 100 may include a carbon-based paper, mat or felt. The diffusion media 100 may exposed to open-air plasma, ozone or chemical oxidation to provide active groups (AG) 16 on a surface thereof. Thereafter, an ionic polymer or a polymer including polar groups may be grafted to the diffusion media layer 100 by reaction with the active groups (AG) 16 to provide ionic or polar groups (PG) 18 on the surface of the diffusion media layer 100. The ionic or polar groups (PG) 18 make the surface of the diffusion media layer hydrophilic.

Figure 5:
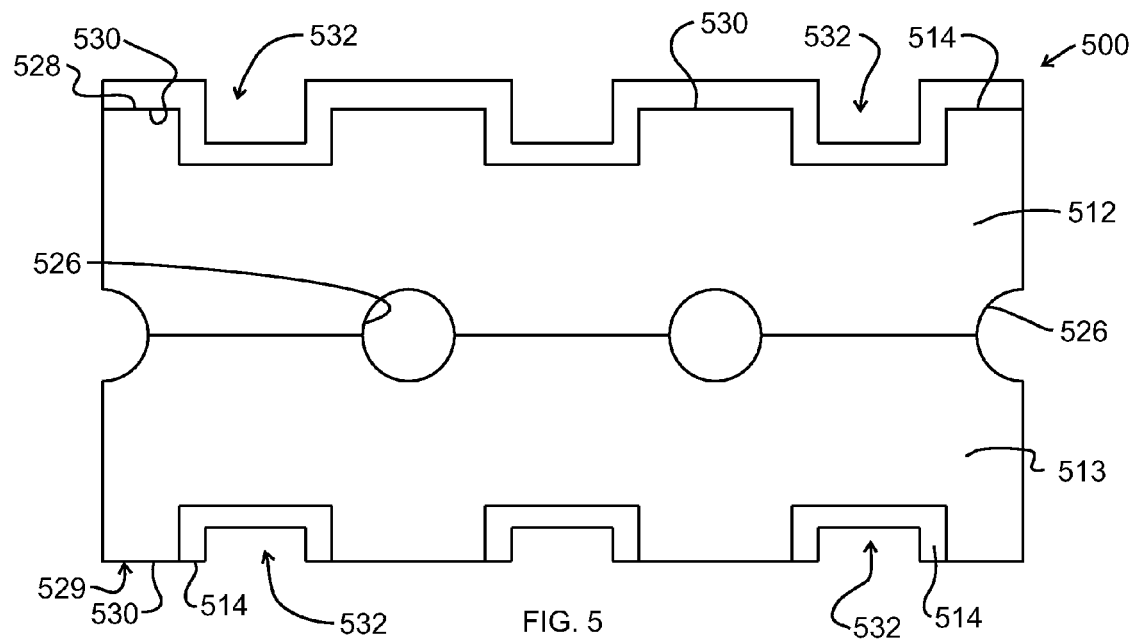
FIG. 5 illustrates a fuel cell bipolar plate having a reactant gas flow field machine, etched or cast into opposite faces thereof and a hydrophilic coating comprising a carbon chain and at least over a portion of one of the faces according to one exemplary embodiment.

Referring now to FIG. 5, another exemplary embodiment of the invention includes a fuel cell bipolar plate 50 including a first substrate 512 having a first face 528 having a reactant gas flow field defined therein by a plurality of lands 530 and channels 532. A coating 514 including a polymer having a carbon chain and an ionic polymer or polymer with polar groups grafted thereto is provided over the face 528 including the lands 530 and channels 532. A second substrate 513 may be provided having a first face 529 having defined therein a reactant gas flow field including a plurality of lands 530 and channels 532. A coating 514 including a polymer including a carbon chain and an ionic polymer or a polymer including polar groups grafted thereto is provided over at least a portion of the first face 529. In one exemplary embodiment, the coating 514 is provided only in the channel 532 leaving the lands 530 uncoated.

Figure 6:
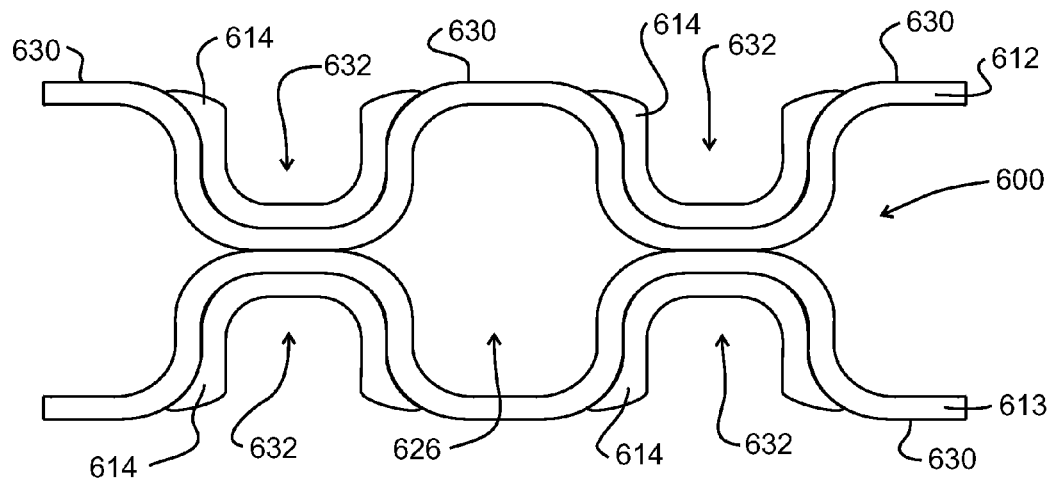
FIG. 6 illustrates another embodiment of a fuel cell bipolar plate including a first and second substrate that had been stamped to provide reacting gas flow fields in faces thereof and a hydrophilic coating comprising a carbon chain over at least a portion of each substrate.

Referring now to FIG. 6, an alternative embodiment of a fuel cell bipolar plate includes a first substrate 612 and a second substrate 613 which have been stamped so that each substrate 612, 613 provides a reactant gas flow field defined in a face thereof including a plurality of lands 630 and channels 632. A coating 614 having grafted ionic polymer or a polymer including polar groups may be provided over a portion of the substrate 612, 613, for example only in the channel 632.

In one embodiment, stainless steel samples were coated with a carbon coating known as EB-023 from Acheson colloids, and then were treated by exposing the carbon coating to atmospheric plasma. Subsequently, the sample was dipped in a 10% PEI solution to graft the ionic polymer to the treated carbon surface. The treated sample was washed thoroughly to remove the excess PEI from coated surface. The treated surface of the carbon coating was then dried out in air and was then tested for its water contact angle. A water contact angle of less than 15 degrees was measured on the sample which is to be compared to values greater than 80 degrees before the treatment. The sample was exposed to air for a period of nine months and the water contact angle did not change indicating that the ionic properties added to the carbon surface by the treatment are less prone to contamination than other hydrophilic surfaces that have been used on fuel cell components.

The above description of embodiments of the invention is merely exemplary in nature and, thus, variations thereof are not to be regarded as a departure from the spirit and scope of the invention.

What is claimed is:

1. A method comprising:
   providing a fuel cell component comprising carbon and a surface including active groups thereon,
   providing a hydrophilic polymer comprising ionic or polar groups and capable of reacting with said active groups;
   grafting said polymer onto the component by reaction with the active groups.

2. A method as set forth in claim 1 wherein the providing a fuel cell component including carbon and a surface with reactive groups thereon comprises providing a substrate having a coating comprising carbon thereon and exposing the component to atmospheric plasma to produce the active groups on the surface of the coating.

3. A method as set forth in claim 2 wherein the coating comprises at least one of epoxies, silicones with graphite particles, polyamide-imides, polyether-imides, polyphenols, fluro-elastomers, polyesters, phenoxy-phenolics, epoxide-phenolics, acrylics, or urethanes polymers, and wherein said active groups comprise oxygenated groups.

4. A method as set forth in claim 2 wherein the coating comprises an epoxy coating.

5. A method as set forth in claim 4 wherein the polymer comprises polyethylenimine and the ionic groups comprise amine groups.

6. A method as set forth in claim 4 wherein the polymer comprises a polyvinyl alcohol and the ionic groups comprise hydroxyl groups.

7. A method as set forth in claim 1 wherein the fuel cell component comprises a diffusion media layer.

8. A method as set forth in claim 1 wherein the fuel cell component comprises a fuel cell bipolar plate having a coating thereon.

9. A method as set forth in claim 8 with a proviso that no low contact resistant metal is provided on the bipolar plate.

10. A method as set forth in claim 8 wherein no gold is provided over the bipolar plate.

11. A method as set forth in claim 8 wherein the coating comprises a polymer and electrically conductive filler particles.

12. A method as set forth in claim 8 wherein the coating comprises graphite.

13. A method as set forth in claim 12 wherein the coating further comprises a second polymer.

14. A method as set forth in claim 1 wherein the fuel cell component is a carbon composite bipolar plate.

15. A method as set forth in claim 1 wherein the fuel cell component comprises a diffusion media layer and wherein the providing the fuel cell component comprising carbon and a surface including active groups, comprises exposing the diffusion media layer to an open-air plasma to create the active groups on a surface of the diffusion media layer.

16. A method as set forth in claim 1 wherein the fuel cell component comprises a bipolar plate having a reactant gas flow field defined in a face thereof by a plurality of lands and channels, and a coating deposited in the channels leaving the lands substantially uncoated, and wherein the carbon is part of the coating.

* * * * *